US008368774B2

(12) United States Patent
Grycewicz (10) Patent No.: US 8,368,774 B2
(45) Date of Patent: Feb. 5, 2013

(54) IMAGING GEOMETRIES FOR SCANNING OPTICAL DETECTORS WITH OVERLAPPING FIELDS OF REGARD AND METHODS FOR PROVIDING AND UTILIZING SAME (75) Inventor: Thomas J Grycewicz, Fairfax, VA (US)

(73) Assignee: The Aerospace Corporation, El Segundo, CA (US)

( * ) Notice: Subject to any disclaimer, the term of this patent is extended or adjusted under 35 U.S.C. 154(b) by 268 days.

(21) Appl. No.: 12/952,079

(22) Filed: Nov. 22, 2010

(65) Prior Publication Data
US 2012/0127331 A1 May 24, 2012

(51) Int. Cl.
H04N 5/228 (2006.01)
H04N 3/14 (2006.01)
G06K 9/00 (2006.01)
G06K 9/32 (2006.01)
G06K 9/40 (2006.01)

(52) U.S. Cl. ............. 348/222.1; 348/295; 348/315; 382/148; 382/299; 382/254

(58) Field of Classification Search ............. 348/222.1, 348/211.9, 295, 315, 144–147; 382/148, 382/299, 254, 266, 278, 219, 216, 218, 279, 382/268, 293; 396/7–13
See application file for complete search history.

(56) References Cited

U.S. PATENT DOCUMENTS

| 3,595,995 | A | 7/1971 | Hobrough |
| 3,905,045 | A | 9/1975 | Nickel et al. |
| 5,220,441 | A | 6/1993 | Gerstenberger |
| 5,341,174 | A | 8/1994 | Xue et al. |
| 5,696,848 | A | 12/1997 | Patti et al. |
| 5,920,657 | A | 7/1999 | Bender et al. |
| 5,946,426 | A | 8/1999 | Carlebarch |
| 5,999,211 | A * | 12/1999 | Hedges et al. ............... 348/144 |
| 6,023,535 | A | 2/2000 | Aoki |
| 6,208,765 | B1 | 3/2001 | Bergen |
| 6,320,611 | B1 | 11/2001 | Pepin |
| 6,535,650 | B1 | 3/2003 | Poulo et al. |
| 7,085,323 | B2 | 8/2006 | Hong |
| 7,227,984 | B2 | 6/2007 | Cavan |
| 7,352,919 | B2 * | 4/2008 | Zhou et al. ............... 382/299 |
| 7,358,474 | B2 | 4/2008 | Flynn |
| 7,379,612 | B2 * | 5/2008 | Milanfar et al. ............ 382/169 |

(Continued)

FOREIGN PATENT DOCUMENTS
WO WO 2009026522 A1 2/2009

OTHER PUBLICATIONS

O'Neil, E.L., "Transfer Function for an Annular Aperture," *Journal of the Optical Society of America*, vol. 46, No. 4, pp. 285-288 (Apr. 1956).

(Continued)

Primary Examiner — Nhan T Tran
Assistant Examiner — Marly Camargo
(74) Attorney, Agent, or Firm — Henricks, Slavin & Holme LLP (57) ABSTRACT Imaging devices and techniques that utilize multiple optical detectors are described and, in particular, imaging geometries for imaging devices that include three or more optical detectors with overlapping fields of regard. The imaging geometries are determined and provided in consideration of one or more performance criteria evaluated over multiple different operating conditions for a process of generating a reconstructed image from the captured images. Imaging systems and methods utilizing the imaging geometries are also described.

16 Claims, 5 Drawing Sheets

U.S. PATENT DOCUMENTS

| | | | |
|---|---|---|---|
| 7,428,324 | B2 | 9/2008 | Crandall et al. |
| 7,606,424 | B2 | 10/2009 | Rohaly |
| 8,120,683 | B1 * | 2/2012 | Tumer et al. ............... 348/295 |
| 8,169,488 | B2 | 5/2012 | Fujiyama |
| 2005/0057687 | A1 | 3/2005 | Irani et al. |
| 2007/0003165 | A1 | 1/2007 | Sibiryakov et al. |
| 2007/0189637 | A1 | 8/2007 | Rohaly |
| 2008/0063294 | A1 | 3/2008 | Burt et al. |
| 2008/0091678 | A1 | 4/2008 | Walker et al. |
| 2008/0212838 | A1 | 9/2008 | Frigerio |
| 2009/0028423 | A1 | 1/2009 | Sandstrom et al. |
| 2009/0148051 | A1 | 6/2009 | Pham et al. |
| 2010/0046853 | A1 * | 2/2010 | Goodnough et al. ......... 382/275 |
| 2011/0115793 | A1 | 5/2011 | Grycewicz |
| 2011/0293146 | A1 | 12/2011 | Grycewicz |

OTHER PUBLICATIONS

Kim, S.P., et al., "Recursive Reconstruction of High Resolution Image From Noisy Undersampled Multiframes," *IEEE Trans Acoustics, Speech, and Signal Processing*, vol. 38, No. 6, pp. 1013-1027 (Jun. 1990).

Tom, B.C., et al., "Reconstruction of a high resolution image by simultaneous registration, restoration, and interpolation of low-resolution images," *Proceedings. of the 1995 International Conference on Image Processing* (Date of Conference: Oct. 23-26, 1995).

Borman, S., et al., "Super-resolution from image sequences—A review," *Proc 1998 Midwest Symp. Circuits and Systems*, pp. 374-378 (1999).

Hochman, G., et al., "Restoration of images captured by a staggered time delay and integration camera in the presence of mechanical vibrations," *Applied Optics*, vol. 43, No. 22, pp. 4345-4354 (Aug. 1, 2004).

Jacobsen, K., "High-Resolution Imaging Satellite Systems," 3D-Remote Sensing Workshop, Porto (2005), accessed at http://www.ipi.uni-hannover.de/uploads/tx_tkpublikationen/HRIjac.pdf.

Grycewicz, T.J., et al., "Joint transform optical correlation applied to sub-pixel image registration," *Proceedings of the SPIE*, vol. 5908, pp, 59080Z-1-59080Z-9 (Sep. 10, 2005).

Haik, O., et al., "Superresolution reconstruction of a video captured by a vibrated time delay and integration camera," *Journal of Electronic Imaging*, vol. 15(2), pp. 023006-1-023006-12 (Apr.-Jun. 2006, published online May 17, 2006).

Krashefski, B., et al., "A Versatile, Producible, Digital, FPA Architecture," *Proceedings of the SPIE*, vol. 6206, pp, 62062W-1-62062W-12 (May 18, 2006).

Ridgway, G.R., "Longitudinal MR Imaging of Dementia (Nine-month Report)," Centre for Medical Image Computing, University College London (Jun. 29, 2006).

Grycewicz, T.J., et al., Fourier plane and optical processing for sub-pixel image registration, *Proceedings of the SPIE*, vol. 6311, pp. 631117-1-631117-8 (Aug. 30, 2006).

Janschek, K., et al., "Performance Analysis for Visual Planetary Landing Navigation using Optical Flow and DEM Matching," *Proceedings of the AIAA Guidance, Navigation and Control Conference 2006*, Keystone, Colorado, Paper No. AIAA-2006-6706 (Date of Conference: Aug. 21-24, 2006).

Pickup, L.C., "Machine Learning in Multi-frame Image Super-resolution," Robotics Research Group, Department of Engineering Science, University of Oxford (2007).

Bodenstorfer, E., et al., "High-speed Line-Scan Camera with Digital Time Delay Integration," *Proceedings of the SPIE*, vol. 6496, pp. 64960I-1-64960I-10 (Feb. 26, 2007).

Grycewicz, T.J., et al., "Estimation bias from using nonlinear Fourier plane correlators for sub-pixel image shift measurement and implications for the binary joint transform correlator," *Proceedings of the SPIE*, vol. 6695, pp. 66950J-1-66950J-11 (Sep. 20, 2007).

Krotosky S.J., et al., "On Color-,Infrared-,and Multimodal-Stereo Approaches to Pedestrain Detection," *IEEE Transactions on Intelligent Transportation Systems*, vol. 8, No. 2, pp. 619-629 (Dec. 2007).

Cota, S.A., et al., "Picasso—An End-to-End Image Simulation Tool for Space and Airborne Imaging System," *Proceedings of the SPIE*, vol. 7087, pp. 708703-1-708703-31 (Aug. 25, 2008).

Grycewicz, T.J., et al., "Focal plane resolution and overlapped array TDI imaging," *Proceedings of the SPIE*, vol. 7087, pp. 708704-1-708704-12 (Aug. 25, 2008).

U.S. Appl. No. 12/619,636: Office Action, Aug. 15, 2012.

* cited by examiner

TDI focal plane layout with offset imaging arrays

Four staggered arrays shifted by 0, ¼, ½, and ¾ pixel, respectively

FIG. 4

Four staggered arrays at the same spacing, but with starting displacements shifted

IMAGING GEOMETRIES FOR SCANNING OPTICAL DETECTORS WITH OVERLAPPING FIELDS OF REGARD AND METHODS FOR PROVIDING AND UTILIZING SAME

STATEMENT REGARDING FEDERALLY SPONSORED RESEARCH OR DEVELOPMENT

The invention was made with Government support under contract No. FA8802-04-C-0001 by the Department of the Air Force. The Government has certain rights in the invention.

CROSS-REFERENCE TO RELATED APPLICATIONS

This application is related to U.S. patent application Ser. No. 12/619,636 entitled "System and Method for Super-Resolution Digital Time Delay and Integrate (TDI) Image Processing" filed on Nov. 16, 2009, which is hereby incorporated by reference.

TECHNICAL FIELD

The invention relates generally to imaging devices and techniques that utilize multiple scanning optical detectors and, in particular, to imaging geometries for imaging devices that include three or more scanning optical detectors with overlapping fields of regard, determining and providing such imaging geometries in consideration of a process of generating a reconstructed image from images captured by the optical detectors, and imaging devices and techniques utilizing such imaging geometries.

BACKGROUND ART

Time delay and integrate (TDI) cameras are operated in sensors where low-light levels and/or high-speed image motion preclude achieving adequate resolution with a snapshot-mode camera. See, e.g.: Farrier, M. and Dyck, R., "A Large Area TDI Image Sensor for Low Light Level Imaging," *IEEE Trans. Electron. Dev.*, Vol. ED-27, No. 8 (1980); and Wong, H.-S., Yao, Y. L., Schlig, E. S., "TDI Charge-coupled devices: Designs and applications," *IBM J. Res. Develop*, Vol. 36, No. 1 (1992).

Reconstruction of a high-resolution image from a sequence of lower resolution images is a way to increase the effective spatial resolution of a camera capturing conventional movie images. See, e.g.: Huang, T. S. and Tsai, R. Y., "Multi-frame image restoration and registration," *Advances in Computer and Image Processing*, Vol. 1, (1984); and Borman, S. and Stevenson, R. L., "Super-resolution from image sequences—A review," *Proc. 1998 Midwest Symp. Circuits and Systems*, pp. 374-378 (1999).

The simplest reconstruction schemes use a simple interlace of the data to form the high-resolution image. See, e.g.: Grycewicz, T. J., Cota, S. A., Lomheim, T. S., and Kalman, L. S., "Focal plane resolution and overlapped array TDI imaging," *Proc SPIE* 708703 (2008); Watson, E. A., Muse, R. A., and Blommel, F. P., "Aliasing and blurring in microscanned imagery," *Proc. SPIE* 1689 (1992); and Gilette, J. C., Stadtmiller, T. M., and Hardie, R. C., "Aliasing reduction in staring infrared imagers using subpixel techniques," *Optical Engineering*, Vol. 34, No. 11 (1995). More robust schemes use a shift-and-add technique. See, e.g.: Farsiu, S., Robinson, D., Elad, M., and Milanfar, P., "Robust Shift and Add Approach to Super-Resolution," *Proc. SPIE* 5203, pp. 121-130 (2003).

The most accurate algorithms use iterative algorithms such as those based on gradient descent or projection onto convex sets (POCS) to optimize the reconstruction for each image set. See, e.g.: Kim, S. P., Bose, N. K., and Valenzuela, H. M., "Recursive Reconstruction of High Resolution Image From Noisy Undersampled Multiframes," *IEEE Trans Accoustics, Speech, and Signal Processing* 38(6), 1990; Tom, B. C., Katsaggelos, A. K., "Reconstruction of a high resolution image by simultaneous registration, restoration, and interpolation of low-resolution images," *Image Processing*, 1995, *Proceedings, International Conference on* (1995); Schultz, R. R. and Stevenson, R. L., "Extraction of High-Resolution Frames from Video Sequences," *IEEE Trans. Signal Processing* 5(6), 1996; and Matson, C. L. and Tyler, D. W., "Primary and secondary super-resolution by data inversion," *Optics Express*, Vol. 13, No. 2 (2006). Real-time applications have generally used the interlace reconstructors. See, e.g.: Alam, M. S., Bognar, J. G., Hardie, R. C., and Yasuda, B. J., "Infrared Image Registration and High-Resolution Reconstruction Using Multiple Translationally Shifted Aliased Video Frames," *IEEE Trans. Instrumentation and Measurement*, Vol. 49, No. 5 (2000).

NASA's Drizzle algorithm applies super-resolution techniques to reconstruct images taken with the wide-field cameras on the Hubble Space Telescope. See, e.g., Fruchter, S. A. and Hook, R. N., "Drizzle: A Method for the Linear Reconstruction of Undersampled Images," PASP 114:144-152 (2002). See also: U.S. Pat. No. 5,341,174 to Xue et al., entitled "Motion Compensated Resolution Conversion System"; U.S. Pat. No. 5,696,848 to Patti et al., entitled "System for Creating a High Resolution Image from a Sequence of Lower Resolution Motion Images"; U.S. Pat. No. 5,920,657 to Bender et al., entitled "Method of Creating a High Resolution Still Image Using a Plurality of Images and Apparatus for Practice of the Method"; U.S. Pat. No. 6,023,535 to Aoki, entitled "Methods and Systems for Reproducing a High-Resolution Image from Sample Data"; U.S. Pat. No. 6,208,765 B1 to Bergen, entitled "Method and Apparatus for Improving Image Resolution"; U.S. Pat. No. 6,535,650 B1 to Poulo et al., entitled "Creating High Resolution Images"; U.S. Pat. No. 7,085,323 B2 to Hong, entitled "Enhanced Resolution Video Construction Method and Apparatus"; and U.S. Pat. No. 7,352,919 B2 to Zhou et al., entitled "Method and System of Generating a High-Resolution Image from a Set of Low-Resolution Images".

Figure 1:
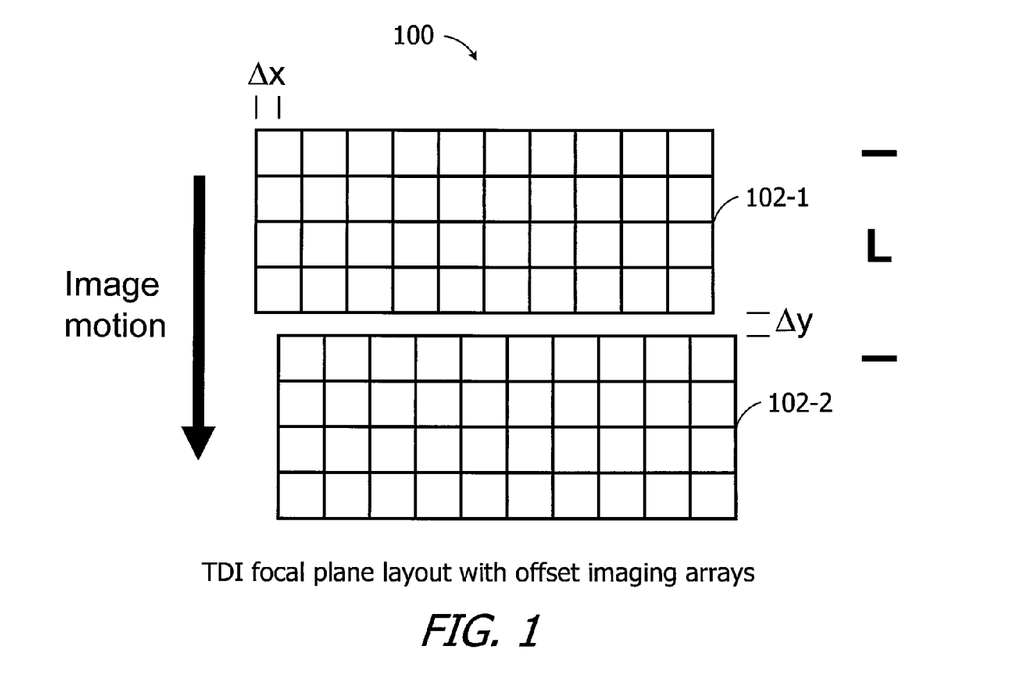
FIG. 1 illustrates a TDI focal plane layout with offset imaging arrays.

Super-resolution reconstruction has been used with line scan and TDI imagers where the focal plane consists of two imaging arrays with a sub-pixel offset between the pixel locations in one array and the locations in the other, as shown in FIG. 1. See, U.S. Pat. No. 7,227,984 B2 to Cavan, entitled "Method and Apparatus for Identifying the Defects in a Substrate Surface by using Dithering to Reconstruct Under-Sampled Images" and Grycewicz et al.

The overlapped array scheme has been implemented for the 2.5 m GSD "supermode" on the ESA SPOT-5 imaging satellite. See, Jacobsen, K., "High-Resolution Imaging Satellite Systems," 3D-Remote Sensing Workshop, Porto (2005), accessed at http://www.ipi.uni-hannover.de/uploads/tx_tkpublikationen/HRIjac.pdf and Poon, J., Smith, L., and Fraser, C., *Orthoimage Resolution and Quality Standards, Project Number 2.3 Final Report*, CRC for Spatial Information, University of Melbourne (2006).

As discussed in Grycewicz et al., overlapped (i.e., staggered) time delay and integrate (TDI) scanning arrays with interlaced columns can provide up to twice the effective resolution of conventional TDI focal plane arrays with the same pixel size when operated under nominal conditions. However, especially when the overlapped TDI arrays are physically separated on the camera focal plane, image drift can destroy the alignment that allows for super-resolution reconstruction of the overlapped images. Even small amounts of uncompensated jitter or image drift have been shown to completely destroy the resolution improvement gained from interlacing offset array data. See, e.g.: Grycewicz et al.; Hochman, G., Yitzhaky, Y. Kopeika, N. S., Lauber, Y., Citroen, M., and Stern, A., "Restoration of Images Captured by a Staggered Time Delay and Integration Camera in the Presence of Mechanical Vibrations," *Applied Optics*, Vol. 43, No. 22, pp. 4345-4354 (2004); and Haik, O. and Yitzhaky, Y., "Supereso­lution reconstruction of a video captured by a translational vibrated staggered TDI camera," *Proc. SPIE* 5558, pp. 815-826 (2004). See also, Young, S. S. and Driggers, R. G., "Superresolution image reconstruction from a sequence of aliased imagery," *Applied Optics*, Vol. 45, No. 21, pp. 5073-5085 (2006).

It would be useful to be able to decrease the susceptibility of overlapped TDI arrays (or other optical detectors arranged with overlapping fields of regard) to loss of high-resolution performance in the presence of image drift. It would be useful to be able to improve the tolerance of overlapped-array imag­ing technologies to scan rate errors. It would be useful to be able to minimize (or decrease) the conditions under which image drift results in severe degradation of the resolution gain potentially realized from the use of staggered arrays. It would be useful to be able to utilize multiple imaging arrays while assuring sufficiently good pixel coverage for super-resolution image reconstruction. It would be useful to be able to utilize three or more overlapped imaging arrays while assuring good performance with moderate image drift. It would be useful to be able to optimize (or enhance) the resolution of images formed from staggered array outputs and, in particular, from three or more staggered array outputs.

SUMMARY OF THE INVENTION

Example embodiments described herein involve arrange­ments of sub-pixel spacing for overlapped imaging arrays (or other optical detectors arranged with overlapping fields of regard) that decrease the susceptibility of the overlapped arrays to loss of high-resolution performance in the presence of image drift. By way of example, physical and/or virtual arrangements of sub-pixel spacing of three or more over­lapped imaging arrays are determined in consideration of a process in which an image is generated (e.g., reconstructed) from outputs of the three or more imaging arrays.

In example embodiments of imaging systems and methods that utilize staggered arrays, arrangements of the arrays are provided that minimize (or decrease) the conditions under which image drift results in severe degradation of the resolu­tion gain potentially realized from the use of staggered arrays. By way of example, an arrangement of scanning arrays (e.g., three or more TDI scanning arrays) is optimized or otherwise determined in order to minimize the impact of off-nominal operating conditions.

In an example embodiment, an imaging system includes an imaging device that includes three or more optical detectors configured to provide captured images. The optical detectors are arranged with overlapping fields of regard according to an imaging geometry determined in consideration of one or more performance criteria evaluated over multiple different operating conditions for a process of generating a recon­structed image from the captured images, the reconstructed image being higher in resolution than the captured images.

In example embodiments, imaging geometries for optical detectors with overlapping fields of regard are determined and/or provided depending upon one or more criteria and/or parameters evaluated over multiple different operating con­ditions.

In an example embodiment, a method of improving the tolerance of an imaging device to scan rate and imaging geometry related errors includes; for, an imaging device that includes three or more imaging arrays configured to provide captured images, determining an imaging geometry for three or more imaging arrays (e.g., a spacing of the imaging arrays) in consideration of one or more performance criteria evalu­ated over a plurality of different operating conditions for a process of generating a reconstructed image from the cap­tured images; and arranging the three or more imaging arrays according to the imaging geometry. In an example embodi­ment, arranging the three or more imaging arrays includes one or more of establishing a geometrical placement of the imaging arrays and providing a virtual offset between the imaging arrays. For example, the virtual offset can include a virtual subpixel shift between the imaging arrays introduced by changes to the timing signals that control image capture.

In example embodiments, sub-pixel shifts are determined depending upon whether the offset (e.g., effective sub-pixel array overlap) can be observed (and/or estimated) and con­trolled in real time in (at least) one dimension.

In an example embodiment, an imaging method includes: for an imaging device that includes three or more imaging arrays configured to provide captured images, where overlap of the imaging arrays can be observed and controlled in real time in at least one dimension; providing an imaging geom­etry for the three or more imaging arrays in consideration of one or more performance criteria; and generating a recon­structed image from the captured images.

DISCLOSURE OF INVENTION

Example embodiments of systems and methods described herein involve determining and/or utilizing sub-pixel arrangements for multiple (e.g., three or more) optical detec­tors (e.g., imaging arrays) that provide captured images as inputs for a process of generating a reconstructed image from the image inputs. In example embodiments, the sub-pixel arrangements are determined in consideration of one or more performance criteria associated with the process of generating a reconstructed image. The performance criteria are evaluated, for example, over multiple different operating conditions under which the process of generating a reconstructed image can be performed. The operating conditions can include optimal conditions, non-optimal conditions, nominal conditions, off-nominal conditions, as well as various combinations of these conditions. The operating conditions can also include one or more ranges of conditions. By way of example, the multiple different operating conditions can include one or more off-nominal operating conditions or ranges of operating conditions that can (or potentially can) cause the cross-scan sub-pixel shift vectors to overlap.

The multiple different operating conditions can also include one or more conditions that represent operating scenarios contained within, or in some manner limited by, a predicted or estimated conditional outer boundary (e.g., for satisfying particular performance criteria). The multiple different operating conditions can also represent operating scenarios selected or specified in consideration of parameters other than, or in addition to, performance criteria.

Referring to FIG. 1, the illustrated focal plane layout with offset imaging arrays denotes a sub-pixel offset Δx (in the cross-scan direction) and a sub-pixel offset Δy (in the along-scan direction). When Δx is ½ pixel, the array columns will be perfectly interlaced in the cross-scan direction under nominal operating conditions. Similarly, if Δy is ½ pixel, 1½ pixels, 2½ pixels, or any odd multiple of ½ pixel, the array rows will interlace perfectly in the along-scan direction under nominal conditions. In this example, a focal plane 100 includes a first TDI array 102-1 and a second TDI array 102-2, and L represents the along-scan distance between the first pixel in the first TDI array 102-1 and the first pixel in the second TDI array 102-2. For a given cross-scan drift δx, the drift as one transitions from array to array is Lδx. This drift (e.g., measured in pixels per line) can be caused by an angular misalignment of the sensor to the track direction. It does not take much cross-scan drift to result in a drift of a pixel or more between arrays. A drift of ½ pixel results in the columns overlapping rather than interlacing. A similar relationship exists between in-scan drift and row interlace. Furthermore, as discussed in Grycewicz et al., a very small shift in the angle between the orientation of the focal plane and the collection path results in the columns of the detection arrays falling on top of one another, rather than interlacing and providing improved resolution.

In example embodiments of the systems and methods described herein, three optical detectors are located in the focal plane in a manner that assures that when cross-scan drift causes the columns of two of the arrays to overlap the third array has a significant sub-pixel displacement. This strategy of arranging arrays can also be extended to four or more arrays.

Figure 2:
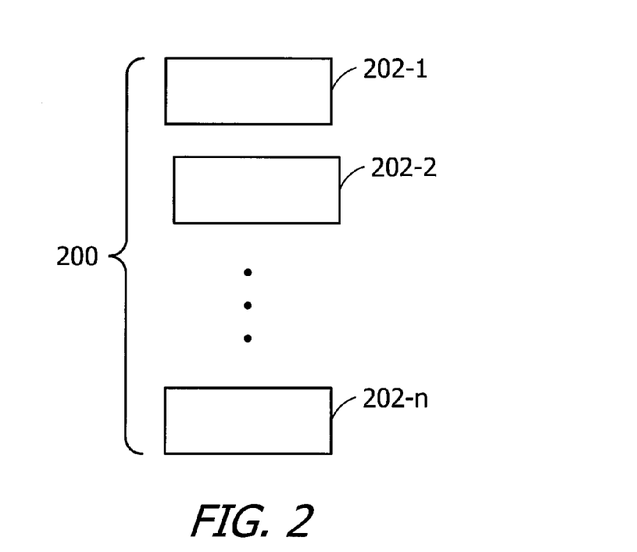
FIG. 2 is a generalized representation of a focal plane configured with three or more offset imaging arrays.

FIG. 2 shows a generalized representation of a focal plane 200 configured with offset imaging arrays, denoted 202-1, 202-2, ... 202-n, respectively, where n≥3. Thus, in various example embodiments, the three or more arrays are arranged to accommodate multiple different operating conditions and/or a range of operating conditions.

Figure 3:
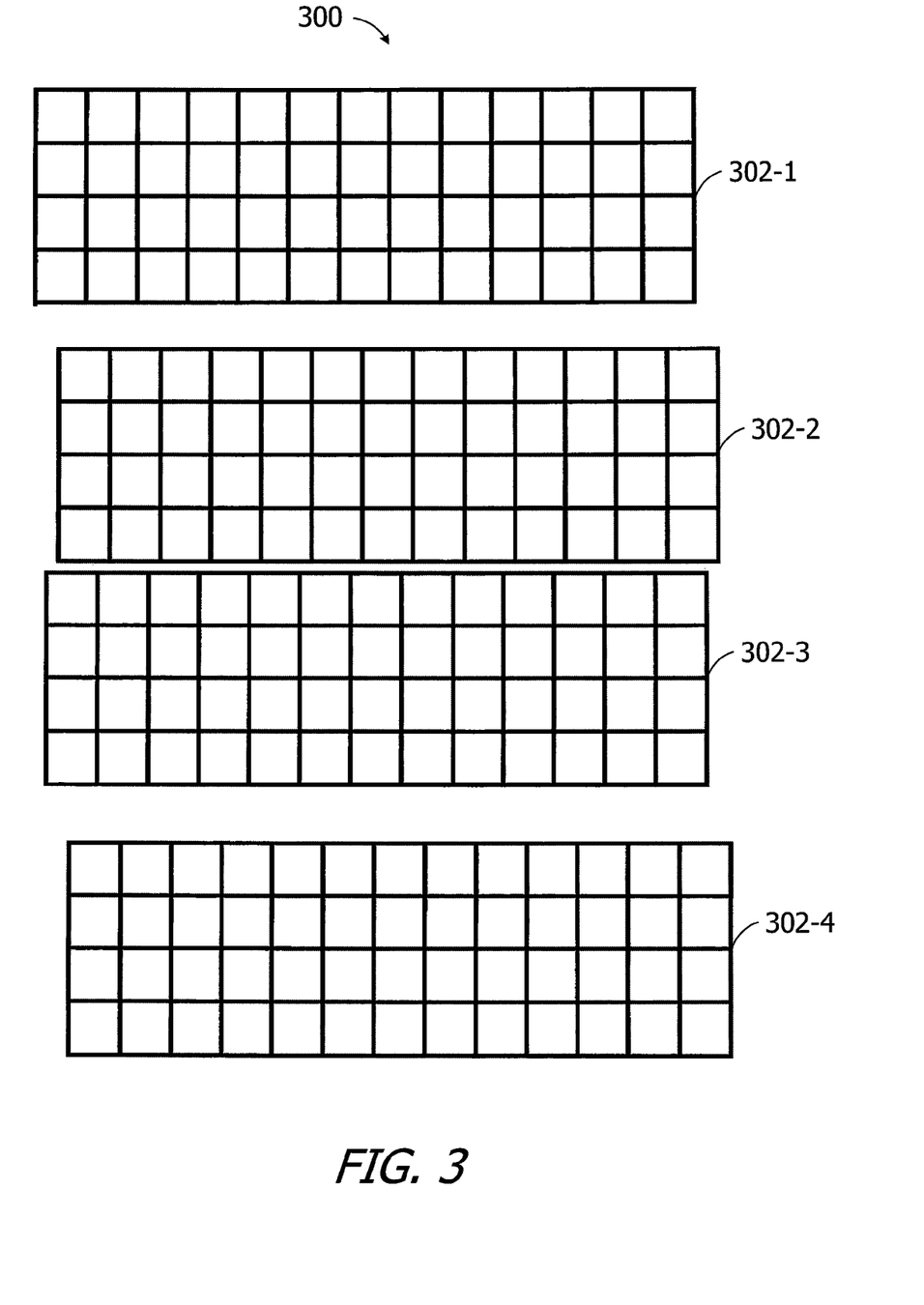
FIG. 3 illustrates an example arrangement of four TDI arrays with differing amounts of offset in the along-scan and cross-scan directions.

FIG. 3 depicts an imaging device 300 and an example arrangement for its four TDI arrays 302-1, 302-2, 302-3 and 302-4 in which differing amounts of offset in the along-scan and cross-scan directions are provided.

In example embodiments, an optimum (or acceptable) positioning of the arrays is determined as a function of one or more parameters. For example, the process of determining positioning (actual and/or virtual) of the arrays is a function of one or more operating parameters and a range of off-nominal conditions which must be accommodated.

A multi-parameter trade study can be utilized to determine positioning of the arrays. By way of example, but not of limitation, in making this determination, the imaging system could be simulated with a range of off-nominal parameters for scan rate, cross-scan drift, or sensor orientation. In order to assess the impact of the off-nominal parameters on system operation, the quality of simulated output images could be assessed. The ability of a super-resolution process to construct an image from multiple input images is limited by the distribution of the mapping of the image pixels to a high-resolution grid. One or more of the following parameters can be taken into consideration: uniformity of input pixel mapping coverage in the output plane at the sub-pixel level, the largest gap (in either x or y direction) to which there is no mapping of an input pixel, and the uniformity of coverage in the spatial frequency domain at spatial frequencies ranging from one to two times the Nyquist frequency of the input images (the frequency range for which the super-resolution process is attempting to recover aliased information).

Example methodologies for arranging the sub-pixel spacing of three or more overlapped arrays to assure good performance with moderate image drift are now described. In example embodiments, the spacing of a set of three or more arrays in alignment facilitates super-resolution reconstruction which can be used to form an image with significantly better resolution than can be achieved with a single array at the same pixel size.

In a one-dimensional illustration, for a series of N input samples with sub-pixel offsets $\chi_i$ where the inputs can be ordered $0 \leq \chi_i < \chi_j < 1$ in units of pixels whenever i<j, a unique reconstruction solution exists if $$H_o(v) \prod_{j=1}^{N-1} H_o(v + j2Bv/N) \prod_{l=j+1}^{N} \sin[\pi(\chi_l - \chi_j)/N] \neq 0, \quad (1)$$

where $H_o(v)$ is the system transfer function, B is the bandwidth of the input, and $\chi=(\chi_1, \ldots, \chi_N)^T$ is the sub-pixel shift vector. See, Prsad, S., "Digital superresolution and the generalized sampling theorem," J. Opt. Soc. Am. A, Vol. 24, No. 2, pp. 311-325 (2007), which is hereby incorporated by reference. The foregoing relationship can be satisfied as long as the input is appropriately band-limited and there is a nonzero spacing between the sub-pixel offsets. When a rotation of the sensor with respect to the scan direction causes the columns of the two offset arrays to overlap rather than interlace, the second condition fails.

Although this argument is a simplification of the typical real world operating environment, it shows where misalignment of the array offset will cause super-resolution processing to break down. Prasad's analysis carries the further conditions that the input signal is noise free and that the input shift vector, $\chi$, is precisely known. In a real operating environment, there is noise on the signal and, in example embodiments, the shift vector is estimated. It has been observed (in relation to super-resolution processing) that resolution improvement is realized as long as knowledge of the shift vector is accurate enough to support the targeted resolution improvement. For example, in a case where the target is to double the resolution of the input samples, at least two non-redundant sub-pixel shifts are needed. When an assumption is made that both the input and output are band-limited signals with the band limit at or lower than the desired output sampling rate, additional input sample sets with sub-pixel shifts result in an over-constrained but noisy input signal.

Figure 4:
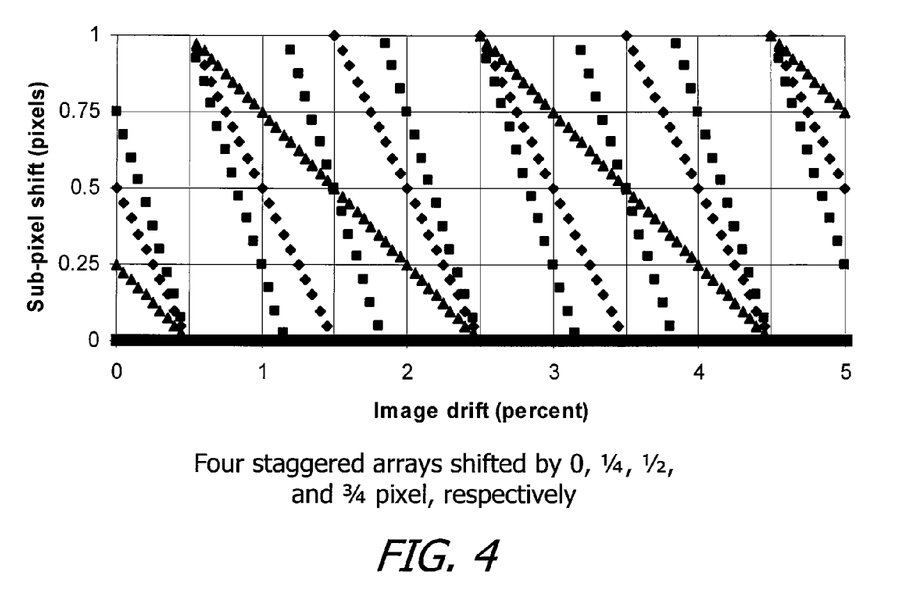
FIG. 4 is a plot showing the cross-scan sub-pixel shift in the presence of image drift seen when four staggered arrays are shifted by 0, ¼, ½, and ¾ pixel, respectively.

FIG. 4 is a plot showing, for an example array configuration, the cross-scan sub-pixel shift in the presence of image drift (e.g., cross-scan drift) seen when four staggered arrays are shifted by 0, ¼, ½, and ¾ pixel in the cross-scan direction. Cross-scan position is shown on the vertical axis, and drift on the horizontal axis. In this example, the arrays are laid out on an even spacing along the line of scan, with each staggered array shifted by a quarter pixel from the previous one. Under nominal operation the cross-scan drift is zero, and the mapping of the pixels to the output array is evenly spaced as they are at the far left of the figure. The sub-pixel shift relative to the first pixel is shown for a range of cross-scan drift from zero to five percent. The first pixel is shown as always having a shift of zero. The diamond, triangle, and square symbols show the output mapping of the pixels in the second, third, and fourth arrays, respectively. In this example, the image drift assumes an array spacing L of 100 pixels between the beginning of one array and the beginning of the next, and cross-scan rate is expressed as a percentage of the nominal in-scan rate. With a cross-scan image drift of only 0.5%, the columns of all four offset arrays line up together. They line up a second time at 2.5% drift and a third time at 4.5% drift. Across the range of performance, the sub-pixel shifts are all in the same half of the pixel roughly half of the time. Thus, in this case, a small cross-scan drift will result in perfect alignment of the sub-pixel shift of all four arrays and poor super-resolution performance results.

Figure 5:
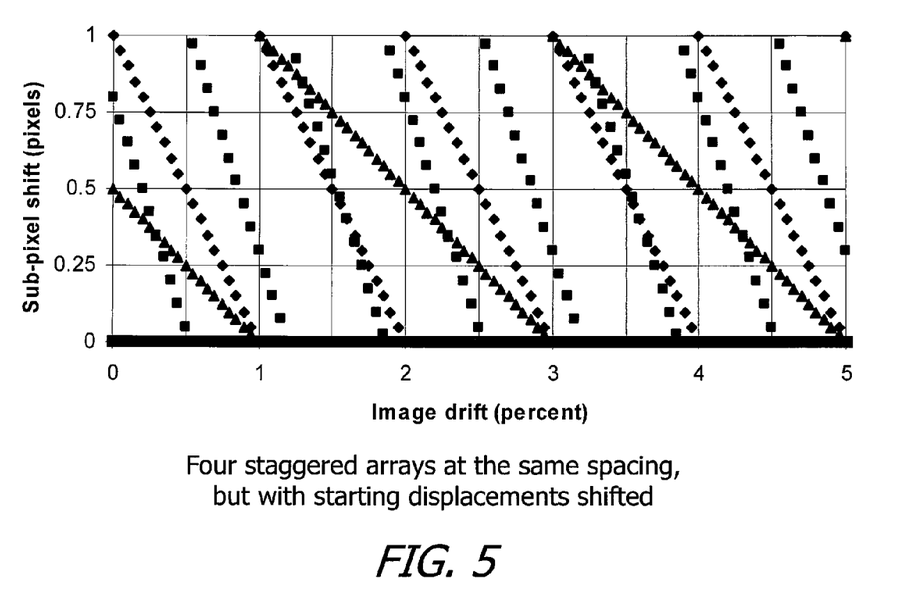
FIG. 5 is a plot showing sub-pixel shift in the presence of image drift seen when four staggered arrays are still at the same spacing, but the starting displacements Dx have been shifted.

FIG. 5 is a plot showing sub-pixel shift in the presence of image drift seen when the four staggered arrays (discussed with reference to FIG. 4) are still at the same spacing, but the starting displacements in the cross-scan direction ($\Delta x$) have been shifted. In this example, the arrangement of the arrays provides much better spacing through a range of cross-scan drift (e.g., providing a better distribution across a range of off-nominal operating parameters). The output mappings still clump near drift rates of one percent and three percent, but the overall coverage is much better than the initial arrangement.

The foregoing discussion and analysis have principally addressed the arrangement of arrays in relation to the cross-scan direction. The arrangement of arrays in relation to the along-scan direction involves similar considerations. However, the origins of the drift and the controllability of the offset are much different. To illustrate these differences, the imaging scenario of a scanning imager on a satellite platform is now considered. In this example, the origin of the cross-scan drift is a misalignment between the attitude of the camera and the ground track. The origin of along-scan drift is a mismatch between the ground speed of the imaging track and the focal plane timing. In order to adjust the sub-pixel component of the overlap between staggered arrays it is not necessary to synchronize the track speed so well as to completely eliminate drift and smear. A change in the relative phase of the focal plane timing signals is equivalent to a change in the sub-pixel spacing between the arrays. For instance, if the staggered arrays are implemented with four-phase CCD arrays, by exchanging the four clocks, the phase can be set in any of four positions, each representing a quarter-pixel shift of the pixel locations on the array. If the sub-pixel offset between the images can be observed and estimated in real time (or estimated based on other measurements, such as estimates of the spacecraft attitude), control of the along-scan offset is practical. Estimation of these offsets can be done, for example, by correlating the image data from one sub-array with the data from another. Controlling the cross-scan drift frequently involves control of the spacecraft attitude, a much more difficult prospect than shifting the timing of the focal plane.

In example embodiments, the techniques described herein can be utilized to provide a virtual offset between overlapping imaging arrays, which can be used either alone or in conjunction with actual offsets (provided by the physical arrangement of the arrays) to assure good pixel coverage for super-resolution image reconstruction.

Figures 6, 7:
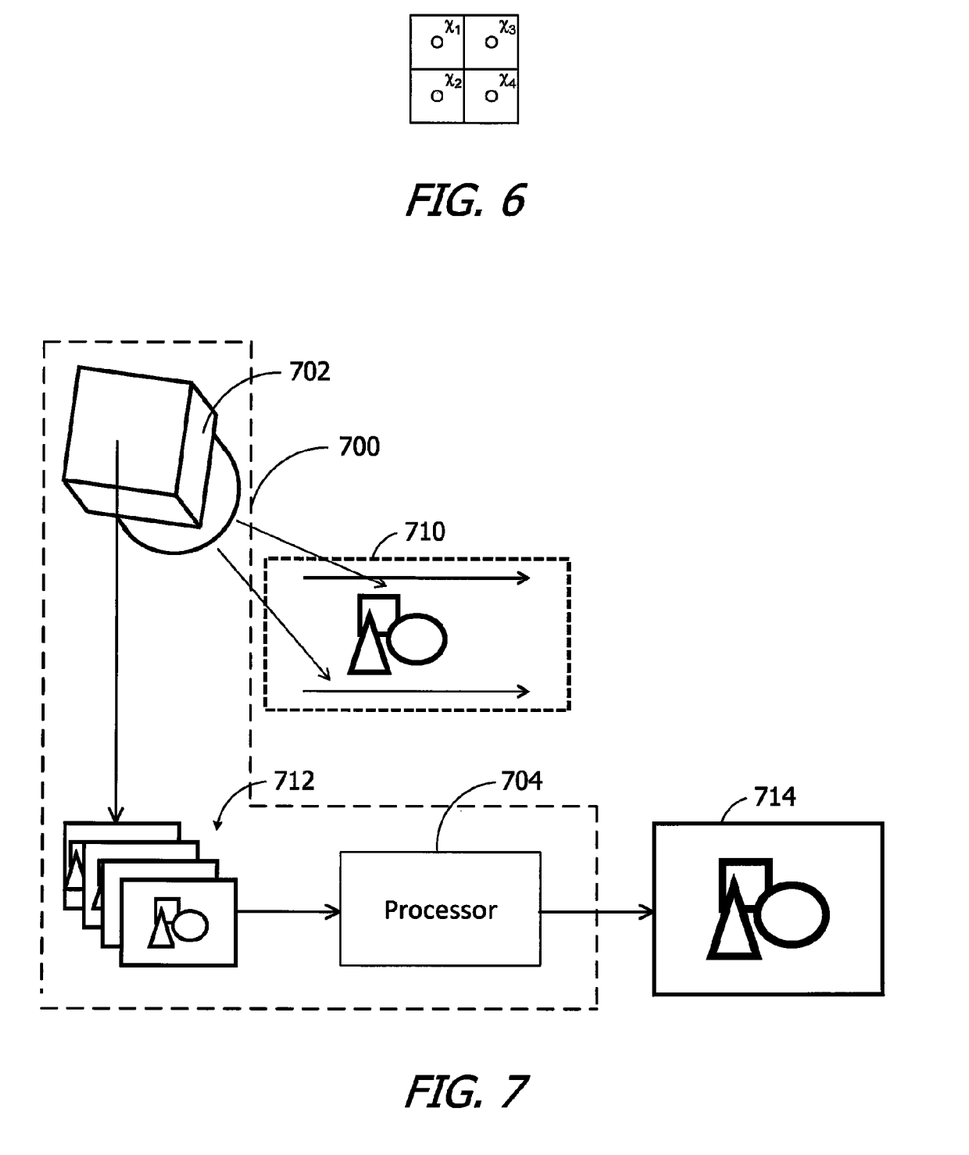
FIG. 6 illustrates an example of a superpixel in which the optimum locations for four sub-pixel shifts are depicted.
FIG. 7 is a block diagram showing an example embodiment of an imaging system.

FIG. 6 illustrates an example of a superpixel in which the optimum locations for four sub-pixel shifts are depicted. In an example embodiment, the goal for merging the information for a four-array interlace reconstructor (reconstruction is accomplished by interlacing the pixels from four input arrays in the correct order) is to be able to map (at least) one array to each quadrant of a superpixel with a size equivalent to the size of the pixel pitch in one of the input arrays.

In example embodiments, sub-pixel shifts are determined depending upon whether the offset (e.g., effective sub-pixel array overlap) can be observed (and/or estimated) and controlled in real time in (at least) one dimension. For example, if the effective sub-pixel array overlap can be observed and controlled in one dimension in real time, then a focal plane with four staggered arrays and super-resolution processing in both dimensions can be implemented utilizing the techniques described herein.

If real-time observation of the cross-scan drift and sub-pixel shift between staggered two-dimensional arrays is possible, the effective sub-pixel shift between the arrays can be adjusted by changing the phase of the timing signals which control image capture. If real-time observation and adjustment of the sub-pixel shift between staggered two-dimensional arrays is possible, in various example embodiments, the optimum number of staggered arrays is four. If real-time adjustment is not possible and super-resolution reconstruction is to be performed other than in real time (e.g., as a post-processing process), in various example embodiments, the optimum number of staggered arrays is five or more.

Assuming that real-time observation of the sub-pixel shifts between four staggered two-dimensional arrays and adjustment of the sub-pixel shift in the along-scan direction between these arrays is possible, and referring again to FIG. 6, an example algorithm for assigning the sub-pixel values is implemented as follows:
1) Order the four measurements by their sub-pixel cross-scan displacements, ($\chi_1$, $\chi_2$, $\chi_3$, $\chi_4$). The order can be rotated in a circular manner. The two displacements which are closest together should be placed in the $\chi_1$ and $\chi_2$ positions.
2) Estimate the sub-pixel along-scan displacements. Adjust the timing phase of the four staggered arrays to make the along-scan sub-pixel displacement of $\chi_1$ and $\chi_3$ close to one another and to make the along-scan displacement of $\chi_2$ and $\chi_4$ about a half pixel away.
3) Reconstruct the image by interlacing the pixels in the order shown in FIG. 6.

The methodologies for performing super-resolution reconstruction can be extended to a higher-resolution interpolation grid. Through proper sensor parameter optimization (or selection), cases where more than two staggered arrays capture redundant data will be minimized, as will be cases where an empty quadrant results (which may necessitate additional process steps, such as filing in the empty quadrant through interpolation). In most cases, a focal plane with five to six staggered arrays will generally have robust performance.

Referring to FIG. 7, in an example embodiment, an imaging system 700 (denoted in dashed lines) includes an imaging device 702 that is operatively interconnected to a processor (or other computing device) 704. In an example embodiment, the imaging device 702 is a sensor that is responsive to electromagnetic radiation in the visible, infrared, millimeter wave, terahertz, ultraviolet, x-ray, or gamma ray region of the spectrum. The imaging device 702 can be a staring array imager and, for example, include a focal plane array (FPA). The imaging device 702 can be a charge-coupled device (CCD) array, an active-pixel imager, or a Complementary Metal-Oxide-Semiconductor (CMOS) array. In an example embodiment, the imaging device 702 includes three or more optical detectors (e.g., linear detector arrays) configured to capture images. In an example embodiment, the optical detectors are configured to operate in a scan mode.

In an example embodiment, the three or more optical detectors are arranged with overlapping fields of regard according to an imaging geometry determined in consideration of one or more performance criteria evaluated over multiple different operating conditions for a process of generating a reconstructed image from the captured images. In an example embodiment, the reconstructed image is higher in resolution than the captured images.

In an example embodiment, the one or more performance criteria include the robustness of the process of reconstructing a high-resolution image from the low-resolution images, evaluated over multiple different operating conditions (e.g., over a range of off-nominal operating conditions). In an example embodiment, the multiple different operating conditions include one or more conditions under which image drift tends to cause columns of the linear detector arrays to overlap rather than interlace during collection. In an example embodiment, the multiple different operating conditions include one or more conditions under which image drift tends to cause a degradation of a resolution gain provided by a simple stagger pattern of arrays. In an example embodiment, at least one of the operating conditions tends to cause cross-scan sub-pixel shift vectors of the optical detectors to overlap.

In an example embodiment, the three or more optical detectors (e.g., linear detector arrays) are provided with an imaging geometry that specifies a spacing of the optical detectors. In an example embodiment, the spacing of the linear detector arrays is provided through a combination of geometrical placement of the linear detector arrays and a virtual sub-pixel shift between the linear detector arrays introduced by changes to the timing signals that control image capture. In an example embodiment, the imaging device is configured to adjust an effective sub-pixel shift between the linear detector arrays in response to changes in the phase of timing signals that control image capture. In an example embodiment, a cross-scan resolution of the reconstructed image is responsive to the geometric placement of the linear detector arrays, and an in-scan resolution of the reconstructed image is responsive to timing signals provided to the linear detector arrays.

In an example embodiment, an imaging device 702 (such as a high-speed camera sub-system including a fast-framing staring array focal plane) is used as a TDI imager with the TDI imaging geometry optimized as an input to a processor (e.g., the processor 704) programmed to perform the super-resolution image reconstruction process. In an example embodiment, the processor 704 is configured to generate the reconstructed image by interlacing the captured images in one or more dimensions.

The processor 704 can also be programmed to implement other and/or additional processing tasks including, but not limited to, those described herein. In an example embodiment, the processor 704 is configured (programmed) to perform one or more image analysis processes to determine the effective sub-pixel array overlap in real time. In an example embodiment, the processor 704 is configured to generating a reconstructed image from the captured images. In an example embodiment, the processor 704 is configured (programmed) to perform super-resolution reconstruction as a post-processing process.

The processor 704 includes and/or has access to a memory device for storing data. In an example embodiment, the processor 704 is configured to save the images captured by the optical detectors to a data storage device. In an example embodiment, the processor 704 is configured to generate a reconstructed image during a post-processing operation in which the images captured by the optical detectors are retrieved from the data storage device and then processed.

Referring again to FIG. 7, a scene 710 (denoted in dashed lines) to be imaged is shown in motion relative to the imaging device 702. Images 712 captured by the imaging device 702 (in the form of image data) are provided to the processor 704 as depicted. In an example embodiment, a high-speed, low-spatial resolution, (and possibly) low-amplitude resolution movie is captured by the imaging device 702. In an example embodiment, the captured images are under sampled.

In an example embodiment, the processor 704 is programmed to combine the images 712 on a high-resolution grid to reconstruct an image, as described herein. The resulting output image 714 will have higher spatial resolution than the input images 712, and (depending on system parameters) may also have better amplitude-resolution and signal-to-noise ratio (SNR).

Additionally, the super-resolution and other processing techniques described in the references referred to in the section entitled "Background Art", all of which are hereby incorporated by reference, can be implemented as appropriate in providing software programs, modules, etc. to be executed by the processor 704. It should also be appreciated that the processing functionality provided by the processor 704 can be distributed among multiple computing devices and/or provided at least in part via a remote communications link. Other computing configurations can also be implemented.

Figure 8:
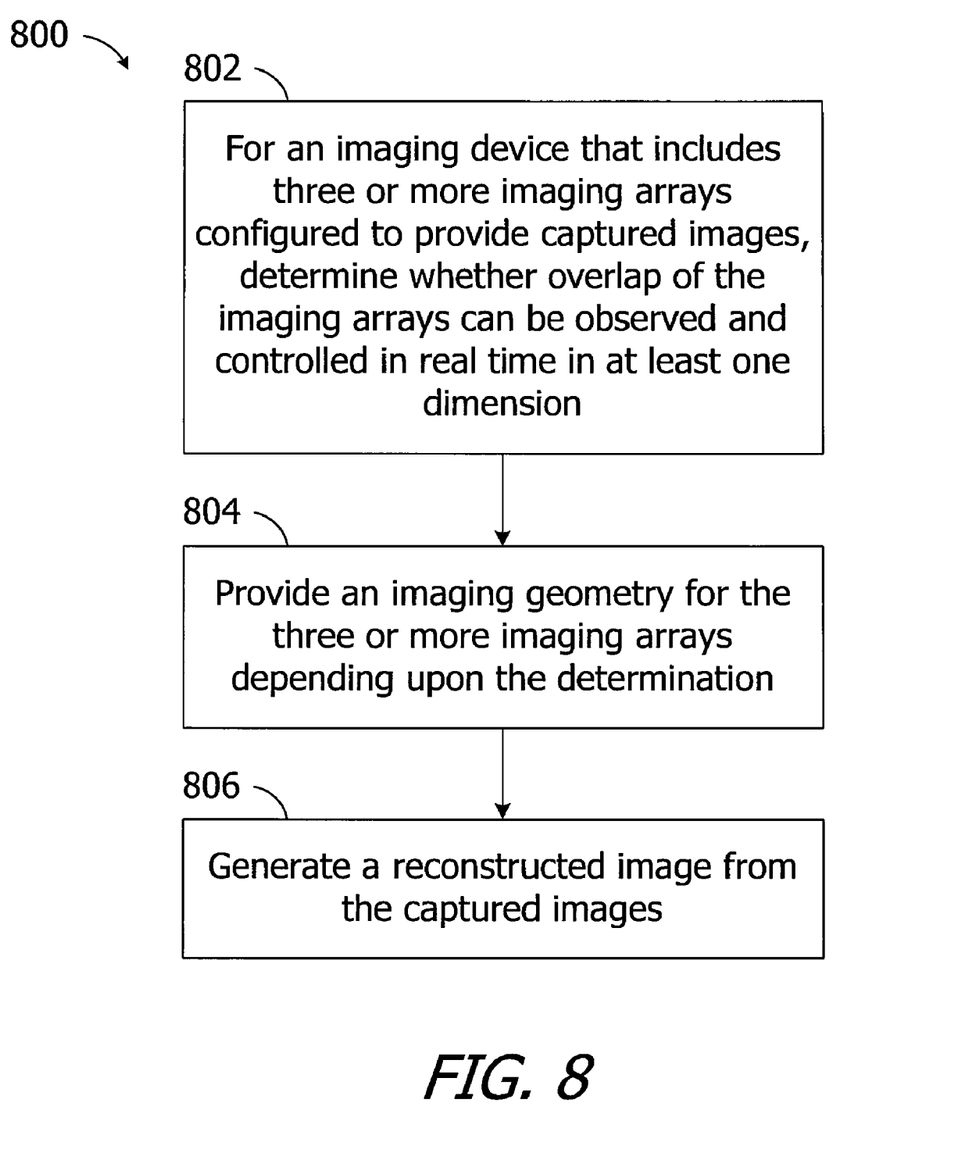
FIG. 8 is a flow diagram showing an example embodiment of an imaging method.

FIG. 8 is a flow diagram showing an example embodiment of an imaging method 800 that utilizes the technologies and methodologies described herein in conjunction with a process of generating a reconstructed image. At step 802, for an imaging device that includes three or more imaging arrays configured to provide captured images, a determination is made as to whether overlap of the imaging arrays can be observed and controlled in real time in at least one dimension. The foregoing determination is made utilizing one or more of the methodologies previously discussed. At step 804, an imaging geometry is provided for the three or more imaging arrays depending upon the determination. At step 806, a reconstructed image is generated from the captured images.

In an example embodiment, the imaging geometry is arranged in consideration of one or more performance criteria evaluated over multiple different operating conditions for the process of generating a reconstructed image from the captured images. In an example embodiment, the determination (of step 802) is made periodically or on an ongoing basis, which provides a methodology for modifying "on the fly" the manner in which the imaging geometry is provided. The determination (of step 802) also serves as a decisional mechanism adjusting the manner in which pixel values are assigned in response to changes in operating conditions.

For example, and as discussed previously in greater detail, if overlap of the imaging arrays can be observed and controlled in real time in at least one dimension, pixel values can be assigned by selecting an order of observed sub-pixel cross-scan displacements and adjusting the timing phase of the imaging arrays to adjust along-scan sub-pixel displacements. The reconstructed image is generated by interlacing pixels in the order selected. In an example embodiment, the reconstructed image generation (of step 804) includes super-resolution processing in two dimensions. By way of further example, if overlap of the imaging arrays cannot be observed and controlled in real time in at least one dimension, pixel values can be assigned by identifying a quadrant-based coordinate frame for sub-pixel shifts that populate all of the quadrants, or come as close as possible to doing so. For quadrants with more than one measurement assigned, the assigned measurements can be averaged (or combined in some other manner) to assign a value. For quadrants where no value was assigned, an interpolation process (e.g., the value is calculated from neighboring pixels) can be used to assign a value. Other processes that take into account values associated with pixels or other regions adjacent to or external to the quadrant or other data can also be utilized. The reconstructed image is generated by interlacing pixels of the quadrant-based coordinate frame. Other types of coordinate frames can also be utilized.

With regard to noise considerations, the super-resolution TDI processing described herein combines the SNR advantages gained through the TDI process with advantages gained through the super-resolution reconstruction process. TDI increases the effective integration time for an image, reducing the effect of Shot noise on the SNR by the square root of the number of TDI stages. (With digital TDI, the effect of read noise is increased by the square root of the number of TDI stages, so efforts must be taken to minimize read noise.)

With super-resolution processing, the detector pixels are generally larger than the pixel pitch of the output image. A SNR gain is realized by using larger pixels (the same as through pixel aggregation), but without the associated reduction in output resolution. If one doubles the size of a pixel in both x and y directions, the signal is increased by a factor of four and the Shot noise is increased by a factor of two (again, the square root relationship). Hence, the signal-to-noise ratio is improved by a factor of two. Of course, it takes four sub-images to build the image with the higher resolution.

In considering, by way of example, a Shot-noise-limited super-resolution imager with an output pitch of half the input pitch operated in a mode with a total integration of sixteen stages, with four sub-images contributing to each output pixel, the high resolution output sums the contributions to each output pixel. The output SNR will benefit by a factor of two from the four TDI samples integrated in the pixel and by a factor of two from the pixel area relationship, for a combined SNR increase by a factor of four. (This increase is compared to the case of a single snapshot using a focal plane where the pixels are sized at the output pitch.) Because each output value is the sum of four reads, it should contain twice the RMS read noise of a single measurement.

Example applications for the technologies and methodologies described herein include: satellite push-broom imaging systems and satellite whisk-broom imaging systems of the type where CCD TDI imagers have traditionally been employed; camera systems to image moving components on high-speed assembly lines (e.g., quality assurance monitoring on an electronic component pick and place system); and cameras in high-speed document sorting systems (e.g., high-speed imagers used to read mail addresses on letters in a mail sorter or to read bank information from checks).

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A method of improving the tolerance of an imaging device to scan rate and imaging geometry related errors, the method comprising:
for an imaging device that includes three or more imaging arrays configured to provide captured images, determining an imaging geometry for three or more imaging arrays in consideration of one or more performance criteria evaluated over a plurality of different operating conditions for a process of generating a reconstructed image from the captured images; and
arranging the three or more imaging arrays according to the imaging geometry;
wherein arranging the three or more imaging arrays includes one or more of establishing a geometrical placement of the imaging arrays and providing a virtual offset between the imaging arrays, the virtual offset including a virtual subpixel shift between the imaging arrays introduced by changes to the timing signals that control image capture.

2. The method of claim 1, wherein the reconstructed image is higher in resolution than the captured images.

3. The method of claim 1, wherein determining the imaging geometry includes determining a spacing of the imaging arrays.

4. The method of claim 1, wherein the one or more performance criteria include the robustness of the process of generating a reconstructed image from the captured images.

5. The method of claim 1, wherein the plurality of different operating conditions include a range of off-nominal operating conditions.

6. The method of claim 1, wherein the plurality of different operating conditions include one or more conditions under which image drift tends to cause columns of the imaging arrays to overlap rather than interlace during collection.

7. The method of claim 1, wherein the plurality of different operating conditions include one or more conditions under which image drift tends to cause a degradation of a resolution gain provided by a simple stagger pattern of arrays.

8. The method of claim 1, wherein at least one of the operating conditions tends to cause cross-scan sub-pixel shift vectors of the imaging arrays to overlap.

9. An imaging method comprising:
for an imaging device that includes three or more imaging arrays configured to provide captured images, where overlap of the imaging arrays can be observed and controlled in real time in at least one dimension;
providing an imaging geometry for the three or more imaging arrays in consideration of one or more performance criteria;
generating a reconstructed image from the captured images;
selecting an order of observed sub-pixel cross-scan displacements;
adjusting the timing phase of the imaging arrays to adjust along-scan sub-pixel displacements; and
generating the reconstructed image by interlacing pixels in the order selected.

10. The imaging method of claim 9, wherein generating the reconstructed image includes super-resolution processing in two dimensions.

11. The imaging method of claim 9, wherein the imaging geometry is arranged in consideration of one or more performance criteria evaluated over a plurality of different operating conditions for the process of generating a reconstructed image from the captured images.

12. The imaging method of claim 11, wherein the one or more performance criteria include the robustness of the process of generating a reconstructed image from the captured images.

13. The imaging method of claim 11, wherein the plurality of different operating conditions include a range of off-nominal operating conditions.

14. The imaging method of claim 11, wherein the plurality of different operating conditions include one or more conditions under which image drift tends to cause columns of the imaging arrays to overlap rather than interlace during collection.

15. The imaging method of claim 11, wherein the plurality of different operating conditions include one or more conditions under which image drift tends to cause a degradation of a resolution gain provided by a simple stagger pattern of arrays.

16. The imaging method of claim 11, wherein at least one of the operating conditions tends to cause cross-scan sub-pixel shift vectors of the imaging arrays to ove

* * * * *